United States Patent [19]

Gray

[11] 3,936,420

[45] Feb. 3, 1976

[54] THERMALLY STABLE, NONBURNING, NONDRIPPING, CHAR FORMING POLYOLEFIN FORMULATIONS

[75] Inventor: Roy A. Gray, Bartlesville, Okla.

[73] Assignee: Phillips Petroleum Company, Bartlesville, Okla.

[22] Filed: July 24, 1973

[21] Appl. No.: 382,170

[52] U.S. Cl. .................. 260/45.8 NT; 260/45.9 NP; 260/45.95 S; 260/34.2
[51] Int. Cl.[2] ............................................. C08G 6/00
[58] Field of Search ............... 260/45.9 NP, 45.8 NT, 45.95 S, 260/34.2

[56] References Cited
UNITED STATES PATENTS

| | | | |
|---|---|---|---|
| 3,337,495 | 8/1967 | Corbett et al. | 260/45.95 S |
| 3,395,746 | 8/1968 | Szabo et al. | 264/53 |
| 3,562,197 | 2/1971 | Sears et al. | 260/45.9 NP |
| 3,649,591 | 3/1972 | Murray et al. | 260/45.9 NP |
| 3,666,715 | 5/1972 | Kutner | 260/45.8 NT |
| 3,714,114 | 1/1973 | Stretanski | 260/45.8 NT |
| 3,810,862 | 5/1974 | Mathis et al. | 260/45.95 S |

*Primary Examiner*—V. P. Hoke

[57] ABSTRACT

A thermoplastic such as polypropylene is blended with flame retardant additives and subjected to elevated temperature such that it is degassed sufficiently to avoid formation of voids or cells in an object molded therewith.

7 Claims, No Drawings

THERMALLY STABLE, NONBURNING, NONDRIPPING, CHAR FORMING POLYOLEFIN FORMULATIONS

This invention relates to the thermoplastic compositions which are thermally stable, nonburning, nondripping and char forming. In one of its aspects, the invention relates to such a composition of a plastic which can be molded without the formation of voids otherwise caused upon molding due to gas formation by ingredients or additives which are compounded with the thermoplastic to give it the desired properties herein discussed.

In a more specific aspect of the invention, it relates to thermally stable, nonburning, nondripping, char forming polyolefin e.g. polypropylene compositions.

In one of its concepts the invention provides a thermally stable composition, as herein described, the composition containing various flame retarding additives which normally cause gas formation upon molding of the composition, the composition having been a priori heated at an elevated temperature such that gas formation takes place and for a time sufficient to thermally degas the composition prior to subjecting the same to a molding operation. In another of its concepts the invention provides a polypropylene formulation containing additive systems e.g. ammonium polyphosphate/dipentaerythritol or melamine pyrophosphate/dipentaerythritol. Optionally, the ammonium polyphosphate/dipentaerythritol additive system can contain a minor amount of melamine as well as fillers, pigments, and the like well known in the art. In a further concept of the invention, compositions as herein described are degassed at temperatures above about 450°F, for example in the range of from about 475° to about 490°F for a time sufficient to desirably degas the same, usually for a time in the range of from about 10 to about 20 minutes.

I have discovered that the formation of voids or cells within objects molded from a composition of polypropylene and fire retardant additive systems, as herein described, can be avoided if before molding the composition it is degassed at an elevated temperature and for a time sufficient that when molding an object from a composition formation of voids will be substantially, if not completely, eliminated.

It is an object of this invention to provide a fire retarded thermoplastic composition. It is another object of this invention to provide a thermally stable, nonburning, nondripping, char forming plastic or a polyolefin composition which can be molded without formation of voids due to action of additive systems compounded with the plastic. It is a further object of this invention to provide a method for so treating a plastic containing an additive system to render it nonburning that such a composition will not form gasses causing voids therein upon molding.

Other aspects, concepts and the several advantages of the invention are apparent from a study of this disclosure and the appended claims.

According to the present invention, a plastic suitable for molding and which normally will burn and which has been rendered nonburning by a compounding therewith of additive systems which are fire retardant is provided in a condition such that when molded, formation of voids due to gas formation by the additive system therein will be avoided, therefor heating the plastic compound with the additive systems at a temperature sufficient and for a time sufficient to cause a sufficient degassing of the composition prior to its being molded upon molding the formation of voids due to gas formation can be substantially if not completely avoided or eliminated.

The invention will now be described with respect to compositions of a polyolefin e.g. polypropylene which will be thermally stable, nonburning, nondripping and char forming, it having been compounded with a fire retardant additive system e.g. ammonium polyphosphate/dipentaerythritol or melamine pyrophosphate/dipentaerythritol. Normally, the compounding is accomplished in a Brabender Plastograph or between pressed platens prior to molding.

The foaming reaction which ensues during practice of the method of the invention appears to arise by an interaction of the combined additives. Thus, the individual ingredients in polypropylene did not cause voids in samples which were molded.

The practice of the present invention upon compositions, such as herein described, does not alter the non-flammability and/or nondripping characteristics of the molded plastic. Thus, the flammability and dripping characteristics of the molded polypropylene samples were not altered by the thermal degassing procedure of the present process.

The following examples illustrate the practice of the present invention.

EXAMPLE I

A formulation with the composition listed below was prepared by blending polypropylene (12 Melt Flow), ammonium polyphosphate, dipentaerythritol, melamine and titanium dioxide on a three-inch roll mill at 320°–350°F for five minutes. Specimens for use in the flame retardant tests were cut from sheets of the formulation that had been molded at 350°–400°F in picture frame molds. Samples used in the flame retardant tests were 5 inches × ½ inch × ⅛ inch.

| Component | Concentration (phr)* |
|---|---|
| ammonium polyphosphate | 40 |
| dipentaerythritol | 16 |
| melamine | 3 |
| titanium dioxide | 3 |

*Given in parts of additive per hundred parts of resin.

Portions of the above formulation were thermally degassed by placing between the platens of a press at 475°F/10 minutes and 490°F/10 minutes. The heated formulations were then molded at 450°F and visually examined in cross section for voids. There could be visually observed a significant reduction in the void formation relative to that experienced when the degassing of the invention was not practiced. Thus, although the samples still possessed small voids, there appeared to be fewer voids than found in samples which had not been thermally degassed by the present inventive process and, generally, the voids were smaller. There appeared to be no visible difference in the extent of void formation whether the samples were degassed at 475°F or at 490°F. The molded specimens from thermally degassed formulations still rated SE-0 by Underwriters Laboratories Test 94 (UL-94) [Mod. Plastics, 48, 92 (Oct. 1970)]. Such a rating indicates that a vertically positioned molded specimen contacted for 10 seconds with a flame extinguishes within 5 seconds after removal of the flame on two successive flame applications and doesn't drip flaming particles capable of igniting a cotton ball positioned 12 inches below the molded specimen. Similar flame retardancy results were obtained after thermally degassing the formulations in a Brabender Plastograph for 20 minute periods at 475°F and 490°F. Small pinhole voids were observed in all molded samples which had been thermally degassed. However, there was a significant improvement in the appearance of the molded product. The oxygen index of a flame retardant polypropylene containing the AP/DPE additive system was 34.9 (ASTM D2863-70). The oxygen index of polypropylene (12 MF) is about 18.

EXAMPLE II

A formulation with the composition shown below was prepared by blending polypropylene (12 Melt Flow), melamine pyrophosphate, and dipentaerythritol on a three-inch roll mill at 320°–350°F for five minutes. Specimens for use in the flame retardant tests were prepared as described in Example I.

| Component | Concentration (phr)* |
|---|---|
| melamine pyrophosphate | 30 |
| dipentaerythritol | 16 |

*As defined in Example I

Portions of the above formulation were thermally degassed as described in Example I and then molded at 450°F. Essentially the same results were obtained as noted in Example I: void formation was still present but to a lesser extent in samples which had been thermally degassed. Molded samples rated SE-0 in the UL-94 test indicating that the specimens were nonburning nondripping polypropylene. The oxygen index of a flame retardant polypropylene containing the MP/DPE additive system was 29.5 (ASTM D2863-70).

It is important in the method of the invention to provide sufficient heat to cause the a priori gas formation to occur to a desired extent. Also, time needs to be provided to allow gas formed to disengage from the thermoplastic. The temperature to which the composition is heated and the correlated time of heating can be determined by routine test for each composition. The temperature to which the composition is heated can exceed the molding temperature.

Suitable temperature and time conditions as set forth herein and as exemplified in the examples given for the practice of the present invention are now tabulated.

| | Suitable | Preferred |
|---|---|---|
| Degassing Temperature °F | 475 to 550 | 490 to 510 |
| Degassing Time (min.) | 2 to 20 | 5 to 10 |

Thermoplastics, e.g. polyolefins to which this invention applies especially are propylene polymers and propylene-containing polymers. Other thermoplastics in which the additives cause void formation upon molding can also be used. The polymers of current commercial interest are solid crystalline polypropylene and solid propylene-ethylene copolymer. In addition, various other additives such as filers, dyes, pigments and the like, as known, can be used in minor amounts in the flame retardant formulations.

The proportions of the several additives herein specifically named in parts per hundred of the plastic are as follows:

Ammonium polyphosphate or melamine pyrophosphate is generally used in the range of 10 to 90 parts per 100 parts of polymer but preferably in the range of 20 to 40 parts of additive per 100 parts of polymer. With either the ammonium polyphosphate or melamine pyrophosphate, dipentaerythritol is usually present in the range of 5 to 30 parts per 100 parts of polymer although a range of 10 to 20 parts per 100 parts of polymer is preferred.

Reasonable variation and modification are possible within the scope of the foregoing disclosure and the appended claims to the invention the essence of which is that there is practiced a degassing prior to molding of a thermoplastic containing fire retardant additives which have a tendency to cause formation of voids upon molding.

I claim:

1. A method for producing a thermally stable, nonburning, nondripping, char forming polyolefin composition which can be molded with little or no undesirable void formation therein due to gas or foam formation resulting from heating together an admixture consisting essentially of a polyolefin and an additive system of ammonium polyphosphate, dipentaerythritol, and melamine composited with the polyolefin to give it the recited properties which comprises degassing such a composition by heating at an elevated temperature above about 450°F for a period of time sufficient to disengage therefrom gas which otherwise would be formed when molding the composition, and molding the degassed composition into a molded article substantially free of undesirable voids.

2. A method according to claim 1 wherein the polyolefin is a propylene containing polymer.

3. A method according to claim 2 wherein the propylene containing a polymer is one selected from solid polypropylene and solid propylene-ethylene copolymer.

4. A method according to claim 1 wherein the degassing is practiced at a temperature of the order of about from 450° to about 490°F for a time in the approximate range of from about 2 to about 20 minutes.

5. A method for producing a thermally stable, nonburning, nondripping, char-forming thermoplastic composition to essentially of a homopolymer or copolymer of propylene, ammonium polyphosphatedipentaerythritol, and melamine which can be molded with little or no undesirable void formation therein due to gas or foam formation resulting from heating additives composited with the thermoplastic to give it the recited properties which comprises degassing such a composition by heating at an elevated temperature above about 450°F for a period of time sufficient to disengage therefrom gas which otherwise would be formed when molding the composition.

6. A method according to claim 5 wherein the degassing is carried out at a temperature of the order of about from 450° to about 490°F for a time in the approximate range of from about 2 to about 20 minutes.

7. A method according to claim 5 wherein the propylene polymer is solid polypropylene or solid propylene-ethylene copolymer.

* * * * *